(12) United States Patent
Talavasek et al.

(10) Patent No.: US 8,075,010 B2
(45) Date of Patent: Dec. 13, 2011

(54) REAR AXLE SYSTEM FOR BICYCLE

(75) Inventors: Jan Talavasek, Morgan Hill, CA (US);
Robb Jankura, Morgan Hill, CA (US);
Jeremy Thompson, Aptos, CA (US);
Brandon Dale Sloan, Morgan Hill, CA (US)

(73) Assignee: Specialized Bicycle Components, Inc., Morgan Hills, CA (US)

( * ) Notice: Subject to any disclaimer, the term of this patent is extended or adjusted under 35 U.S.C. 154(b) by 0 days.

(21) Appl. No.: 12/780,462

(22) Filed: May 14, 2010

(65) Prior Publication Data
US 2011/0278818 A1   Nov. 17, 2011

(51) Int. Cl.
*B62K 19/30* (2006.01)

(52) U.S. Cl. ...... 280/288; 280/284; 280/276; 301/124.2

(58) Field of Classification Search ............ 280/288, 280/276, 279, 288.4, 260, 281.1, 274, 284; 301/110.5, 124.1, 124.2, 125, 111.05
See application file for complete search history.

(56) References Cited

U.S. PATENT DOCUMENTS

| | | | |
|---|---|---|---|
| 0,593,688 A | | 11/1897 | Redding |
| 4,530,543 A | * | 7/1985 | Keane .................... 301/64.707 |
| 4,735,459 A | * | 4/1988 | Massonnet ...................... 301/1 |
| 5,121,973 A | * | 6/1992 | Phillips .................... 301/110.5 |
| 5,238,259 A | * | 8/1993 | Wilson et al. ................. 280/276 |
| 5,292,143 A | * | 3/1994 | Stauch et al. ................. 280/279 |
| 5,364,115 A | * | 11/1994 | Klein et al. .................. 280/288 |
| 5,971,497 A | * | 10/1999 | Lee ........................ 301/111.05 |
| 7,059,686 B2 | | 6/2006 | Kanehisa |
| 7,090,308 B2 | | 8/2006 | Rose et al. |
| 7,441,842 B2 | | 10/2008 | Watarai et al. |
| 7,562,941 B2 | | 7/2009 | Kanehisa |
| 7,648,211 B2 | | 1/2010 | Watarai |
| 7,654,546 B2 | | 2/2010 | Watarai |
| 7,654,548 B2 | | 2/2010 | Kanehisa et al. |
| 7,661,767 B2 | | 2/2010 | Montague et al. |
| 7,669,871 B2 | | 3/2010 | Watarai |
| 7,841,612 B2 | * | 11/2010 | French ..................... 280/279 |
| 7,854,441 B2 | * | 12/2010 | Scurlock .................... 280/261 |
| 7,918,474 B2 | * | 4/2011 | Waxham .................... 280/288 |
| 2005/0110335 A1 | | 5/2005 | Rose et al. |
| 2005/0184581 A1 | | 8/2005 | Watarai et al. |
| 2006/0087096 A1 | * | 4/2006 | Turner ..................... 280/279 |
| 2006/0158022 A1 | | 7/2006 | Nicolai |
| 2007/0052286 A1 | * | 3/2007 | Montague et al. ......... 301/124.2 |
| 2007/0069498 A1 | * | 3/2007 | Raddin ..................... 280/279 |
| 2007/0194620 A1 | | 8/2007 | Kanehisa |

(Continued)

*Primary Examiner* — Anne Marie Boehler
*Assistant Examiner* — Tashiana Adams
(74) *Attorney, Agent, or Firm* — Michael Best & Friedrich LLP

(57) ABSTRACT

A bicycle including a front wheel, a rear wheel, and a frameset supported by the front wheel and the rear wheel. The rear wheel includes a first end cap and a second end cap, and each end cap has an aligned hole extending through the end cap. The rear wheel includes an axle that is positioned in the holes in the end caps and that defines an axial direction. The frameset includes a first dropout and a second dropout, each including an opening. The axle is positioned in the opening of each dropout. Each drop out has a lip that defines a slot aligned with and larger than the openings. Each of the lips is dimensioned to receive a corresponding end cap of the rear wheel. The lip of the first dropout has an axial length less than the lip of the second dropout.

16 Claims, 5 Drawing Sheets

U.S. PATENT DOCUMENTS

| | | |
|---|---|---|
| 2008/0191545 A1 | 8/2008 | Laird |
| 2009/0072613 A1 | 3/2009 | Inoue et al. |
| 2009/0134696 A1 | 5/2009 | Laird |
| 2009/0230653 A1 | 9/2009 | Spahr et al. |
| 2009/0315295 A1 | 12/2009 | Laird et al. |
| 2010/0127472 A1* | 5/2010 | Winefordner et al. ........ 280/276 |
| 2011/0042917 A1* | 2/2011 | Cleveland ..................... 280/288 |
| 2011/0084546 A1* | 4/2011 | Lude .......................... 301/124.1 |

* cited by examiner

REAR AXLE SYSTEM FOR BICYCLE

BACKGROUND

The present invention relates to rear axle systems for bicycles.

Prior art bicycles have employed through-axle systems for both front and rear axles. For example, U.S. Pat. No. 7,654,548 and U.S. Patent Publication No. 2009/0072613 each disclose an axle securing structure that includes two lips that define slots for receiving a portion of a wheel hub, and holes in the frame dropouts for receiving a axle. The axle is inserted through the hole in one of the dropouts, through an opening on the hub, and is then threaded into the other dropout. The axle can include a quick-release mechanism that facilitates toolless insertion and removing of the axle.

When utilized on a rear wheel of a bicycle, the slots define a hub spacing, and the lips (which define the slots) determine a clearance width less than the hub spacing. For example, in one conventional arrangement, the hub spacing is 142 mm and the clearance width is 135 mm, due to the fact that the lips each have a length (parallel to the axle) of 3.5 mm.

SUMMARY

The present invention provides a bicycle that includes a front wheel, a rear wheel, and a frameset supported by the front wheel and the rear wheel. The rear wheel includes a first end cap (e.g., a right end cap) and a second end cap (e.g., a left end cap), and each end cap has an aligned hole extending through the end cap. The rear wheel also includes an axle that is positioned in the holes in the end caps and that defines an axial direction. The frameset includes a first dropout (e.g., a right dropout) and a second dropout (e.g., a left dropout). Each dropout has an opening aligned with the holes in the end caps. The axle is positioned in the opening of each dropout. Each drop out also has a lip that defines a slot aligned with and larger than the openings. Each of the lips is dimensioned to receive a corresponding end cap of the rear wheel. The lip of the first dropout has an axial length less than the lip of the second dropout. For example, the axial length of the lip of the first dropout can be less than 75% (preferably less than 60% and more preferably less than 50%) of an axial length of the lip of the second dropout.

In another embodiment, the first and second end caps are spaced from each other to define a hub spacing, and the rear wheel further includes an outer cog adapted to drive the rear wheel (e.g., by a chain driven by a crankset pedaled by the rider). In this embodiment the slot defines a recessed surface of the dropout, and a cog spacing from a center of the cog to the recessed surface is less than 5% (preferably less than 4.5% and more preferably less than 4%) of the hub spacing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
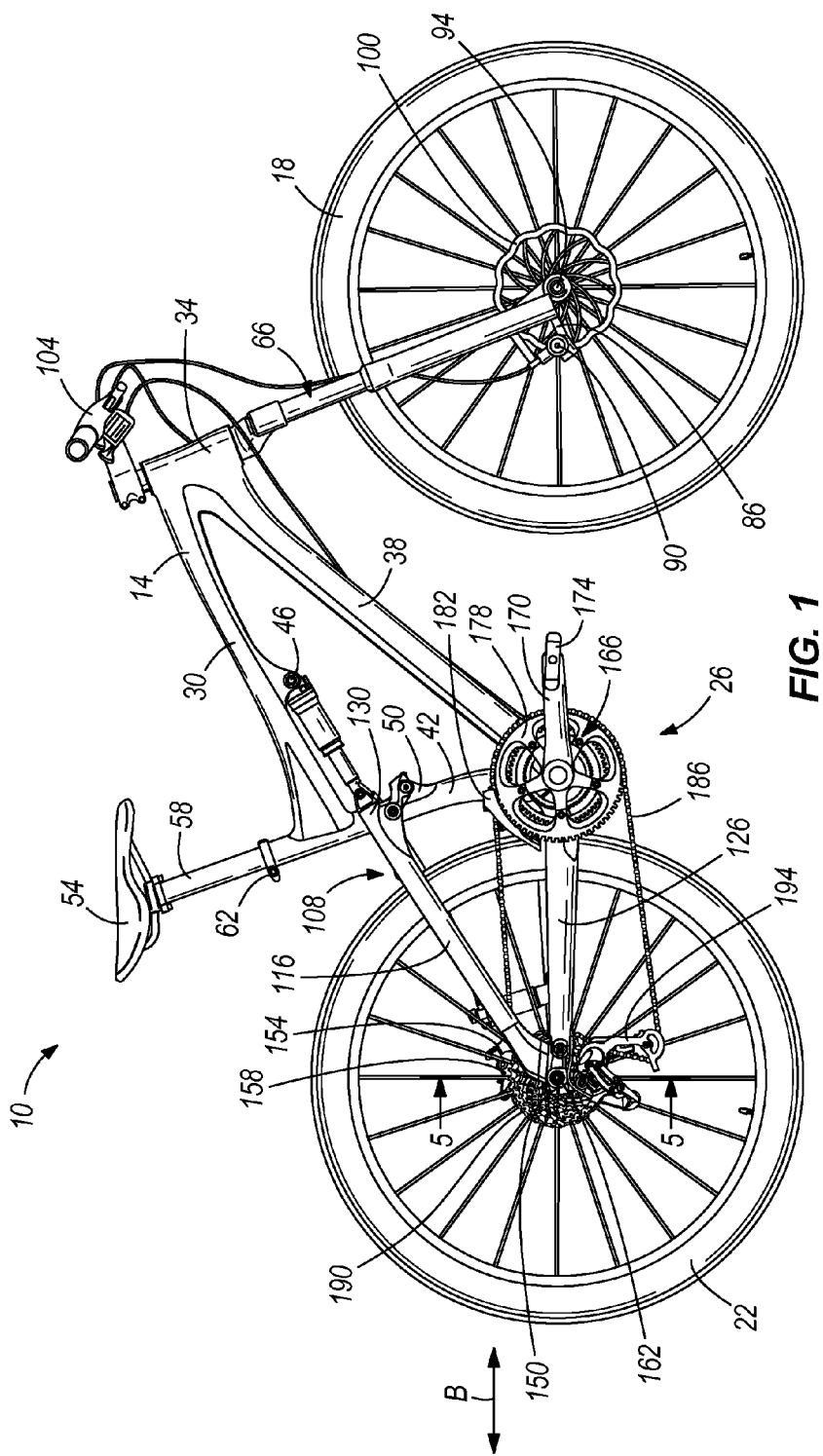
FIG. 1 is a right side view of a bicycle according to one embodiment of the invention.

FIG. 1 shows a bicycle 10 that includes a frameset or frame 14, a front wheel 18, a rear wheel 22, and a drive train 26. The frame 14 includes a top tube 30, a head tube 34, a down tube 38, and a seat tube 42. A top tube mount 46 is disposed on the underside of the top tube 30 and a seat tube mount 50 is disposed on the front side of the seat tube 42. A saddle 54 including a seat post 58 is mounted to the frame 14 with a clamp 62.

The frame 14 is connected to the front wheel 18 by a front fork 66 rotatably received within the head tube 34. A handle bar assembly 104 is clamped to the front fork 66 and may be manipulated by the user to steer the bicycle 10, apply the brakes, adjust the drive train 26, and perform other duties, as desired.

The frame 14 further includes a rear triangle 108 connected to the rear wheel 22. The rear triangle 108 includes a left seat stay 112 (see FIG. 4), a right seat stay 116, a seat stay bridge that connects the left seat stay 112 and the right seat stay 116, a left chain stay 122, a right chain stay 126, and a shock mounting portion 130.

A rear left dropout 146 is disposed at a lower end of the left seat stay 112 and a rear right dropout 150 is disposed at the end of the right seat stay 116. A rear brake mount 154 is disposed on the upper side of the left seat stay 112 (see FIG. 4), and is adapted to support a rear brake in the form of a rear disk brake caliper 158. A rear axle 162 rotatably secures the rear wheel 22 in the dropouts to rotatably secure the rear wheel 22 to the frame 14. The rear axle 162 defines an axial direction along an axis A about which the rear wheel 22 rotates. A lateral direction B is defined as a direction perpendicular to the axis A.

The drive train 26 includes a crankset 166 rotatably mounted to the bottom bracket. The crankset 166 includes two crank arms 170, two pedals 174, and three chain rings 178. In other constructions a different number of chain rings 178 may be used, as desired. A front derailleur 182 shifts a chain 186 between the different chain rings 178, and is actuated by the handle bar assembly 104. A plurality of rear cogs 190 are mounted to the rear wheel 22 and connected to the crankset 166 by the chain 186. A rear derailleur 194 shifts the chain 186 between the different rear cogs 190, and is actuated by the handle bar assembly 104.

Figure 2:
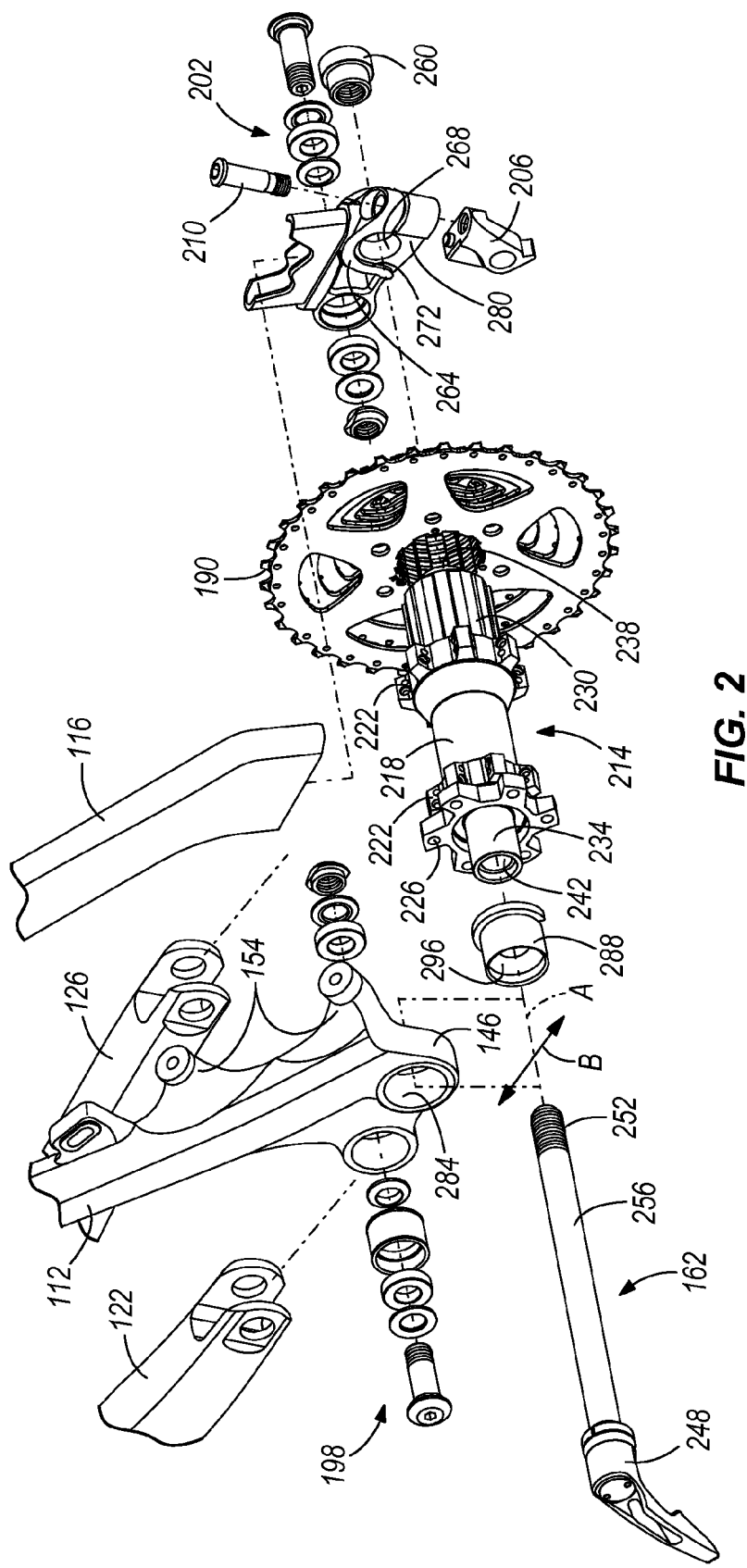
FIG. 2 is an exploded view of a rear axle system of the bicycle of FIG. 1.

Turning to FIG. 2, the rear axle system will be described in detail. The left chain stay 122 connects to the left seat stay 112 with a fastener 198. Likewise, the right chain stay 126 connects to the right seat stay 116 with a fastener 202. A rear derailleur hanger 206 is connected to the rear right dropout 150 with a fastener 210. In other constructions, the rear derailleur hanger 206 may be formed as a single piece with the rear right dropout 150, may be connected in a different way (e.g., welding, brazing, adhesive) or may be attached to a different component (e.g., the rear right chain stay 126, the right seat stay 116). Additionally, the left chain stay 122 and the left seat stay 112 may be formed as a single piece or be coupled together differently. Likewise, the right chain stay 126 and the right seat stay 116 may be formed as a single piece or be coupled together differently, as desired.

The rear wheel 22 includes a hub 214 with a body 218, spoke flanges 222 for attaching spokes, a rear brake disk flange 226 for attaching the rear brake disk (not visible) to the hub 214, a cogset spline portion 230 for receiving the rear cogs 190, a left end cap 234, and a right end cap 238. Inside the body 218, a bearing set (not shown) couples the hub 214 to the rear axle 162 such that the rear wheel 22 can freely rotate about the rear axle 162. The left end cap 234 and the right end cap 238 are spaced apart from one another to define a hub spacing C (see FIG. 5). Each of the left end cap 234 and the right end cap 238 defines an outer diameter and lateral dimension D of nineteen millimeters and includes an aperture 242 or hole extending through the respective end cap 234, 238. Each aperture 242 is aligned and parallel with respect to the axis A when installed on the bicycle 10. In other constructions, the lateral dimension D of the end caps may be more or less than nineteen millimeters, as desired. It should also be appreciated that the end caps can be separate parts or can be formed integrally with each other (e.g., each defined by an opposing end of a common shaft).

The rear axle 162 includes a quick connect cam 248, a threaded portion 252, and a bearing portion 256 between the quick connect cam 248 and the threaded portion 252. In the illustrated embodiment, the rear axle 162 has a diameter of twelve millimeters (12 mm) that defines a lateral dimension E of the rear axle 162. In other constructions the lateral dimension E of the rear axle 162 may be more or less than twelve millimeters, as desired.

Figure 3:
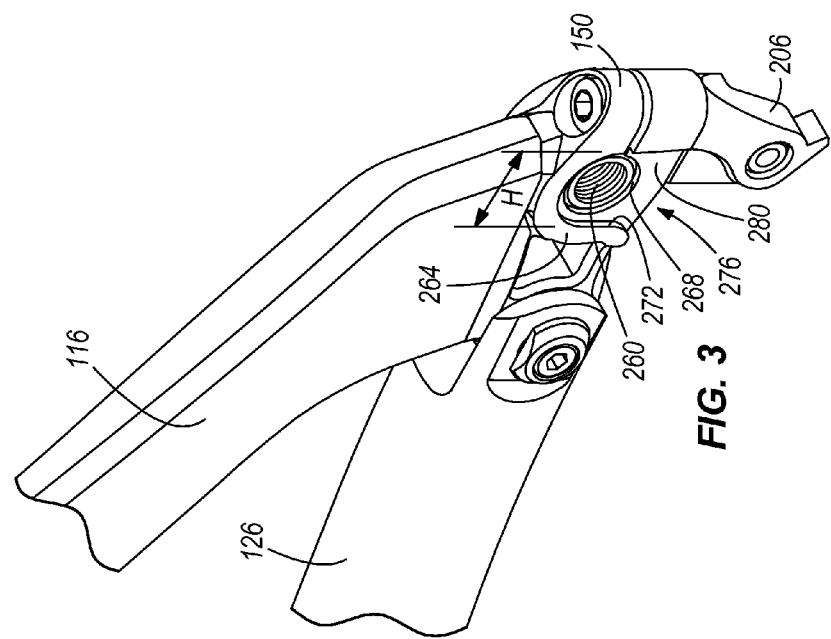
FIG. 3 is a perspective view of a right dropout of the rear axle system of FIG. 2.
Figure 6:
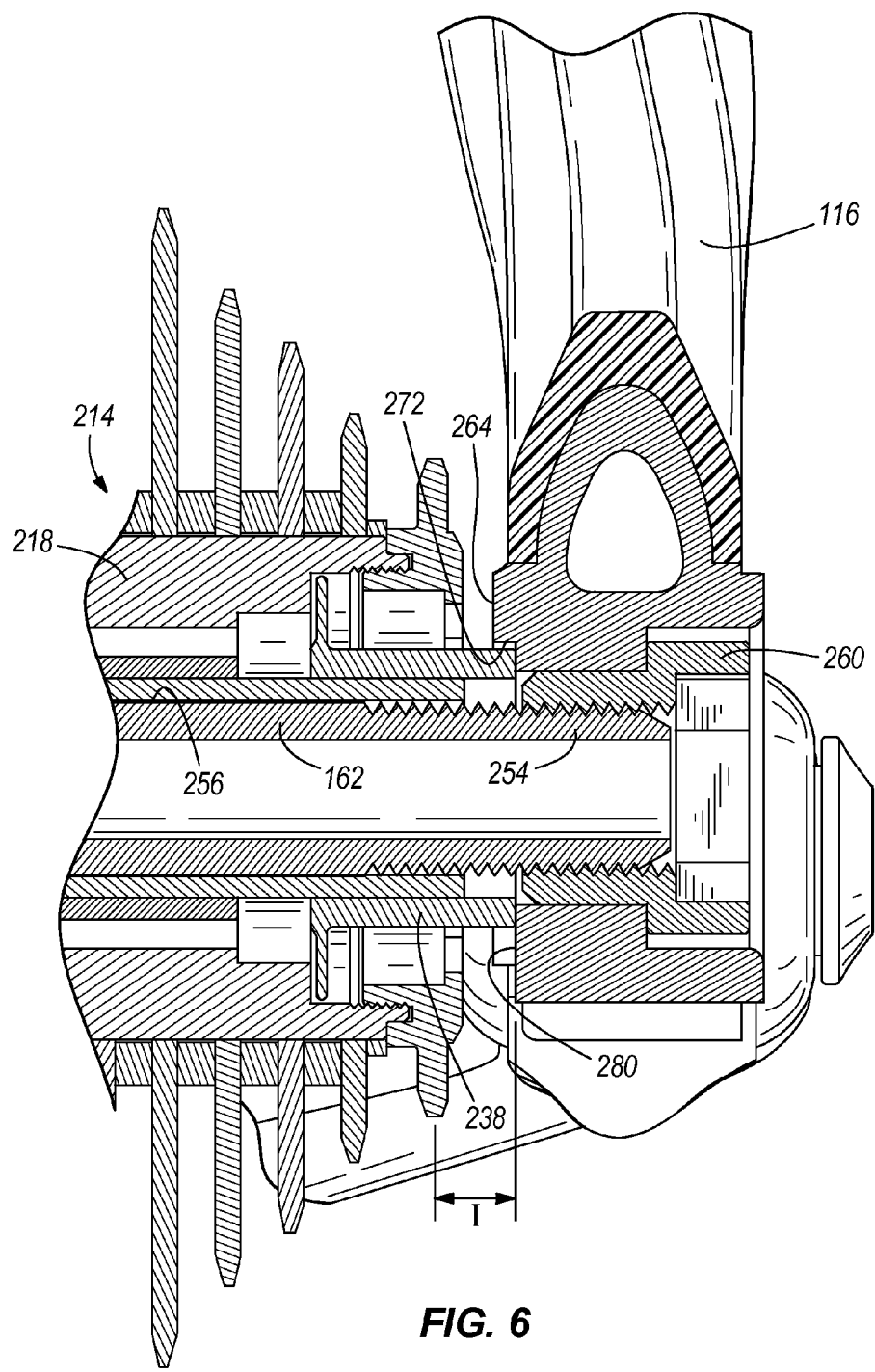
FIG. 6 is an enlarged section view of a right portion of FIG. 5.

FIGS. 3 and 6 show the rear right dropout 150 in more detail. The rear right dropout 150 defines a right inner surface 264 and includes an aperture 268 and a nut 260 held via compression fit within the aperture 268 due to tightening of the fastener 210. The nut 260 includes an internally threaded hole. A right lip 272 defines a right slot 276 sized to receive the right end cap 238 of the hub 214. The right slot 276 defines a right recessed surface 280, and the axial length F or depth of the illustrated right lip 272, defined between the right inner surface 264 and the right recessed surface 280, is about one and one-half millimeters (1.5 mm).

Figure 4:
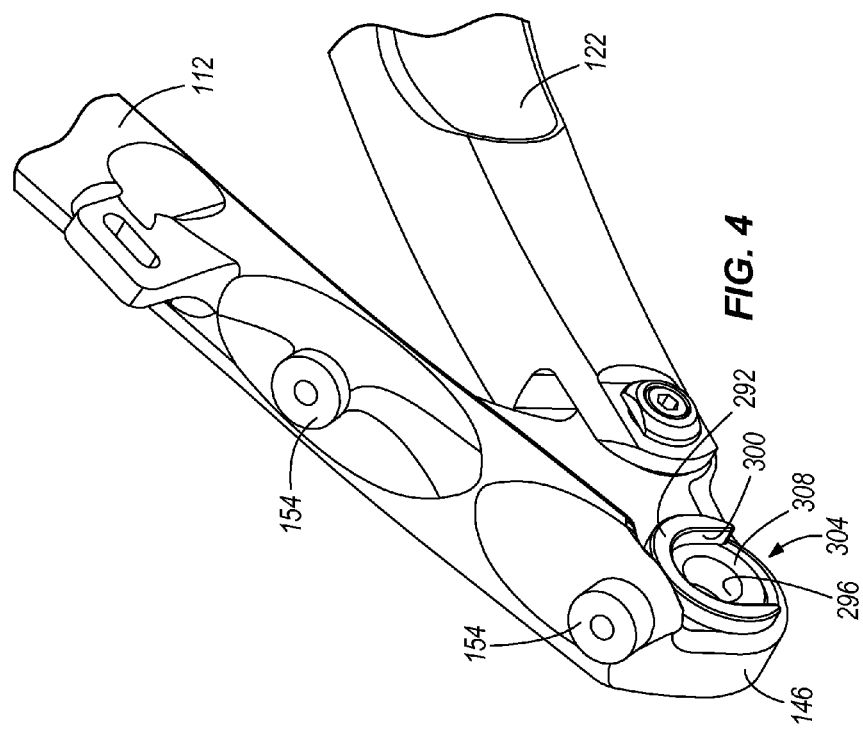
FIG. 4 is a perspective view of a left dropout of the rear axle system of FIG. 2.

Turning back to FIG. 2, the rear left dropout 146 includes an opening in the form of an aperture 284 and an insert 288 sized to be received by the aperture 284. In the illustrated construction, the insert 288 is press fit into the aperture 284. Alternatively, the insert 288 could be formed as a single piece with the rear left dropout 146 or attached in another way, as desired. FIG. 4 shows the rear left dropout 146 in more detail. The insert 288 defines a left inner surface 292 and includes an aperture 296 sized to receive the rear axle 162. A left lip 300 defines a left slot 304 sized to receive the left end cap 234 of the hub 214. The left slot 304 defines a left recessed surface 308, and the axial length G or depth of the illustrated left lip 300, defined between the left inner surface 292 and the left recessed surface 308, is about three and one-half millimeters (3.5 mm).

Figure 5:
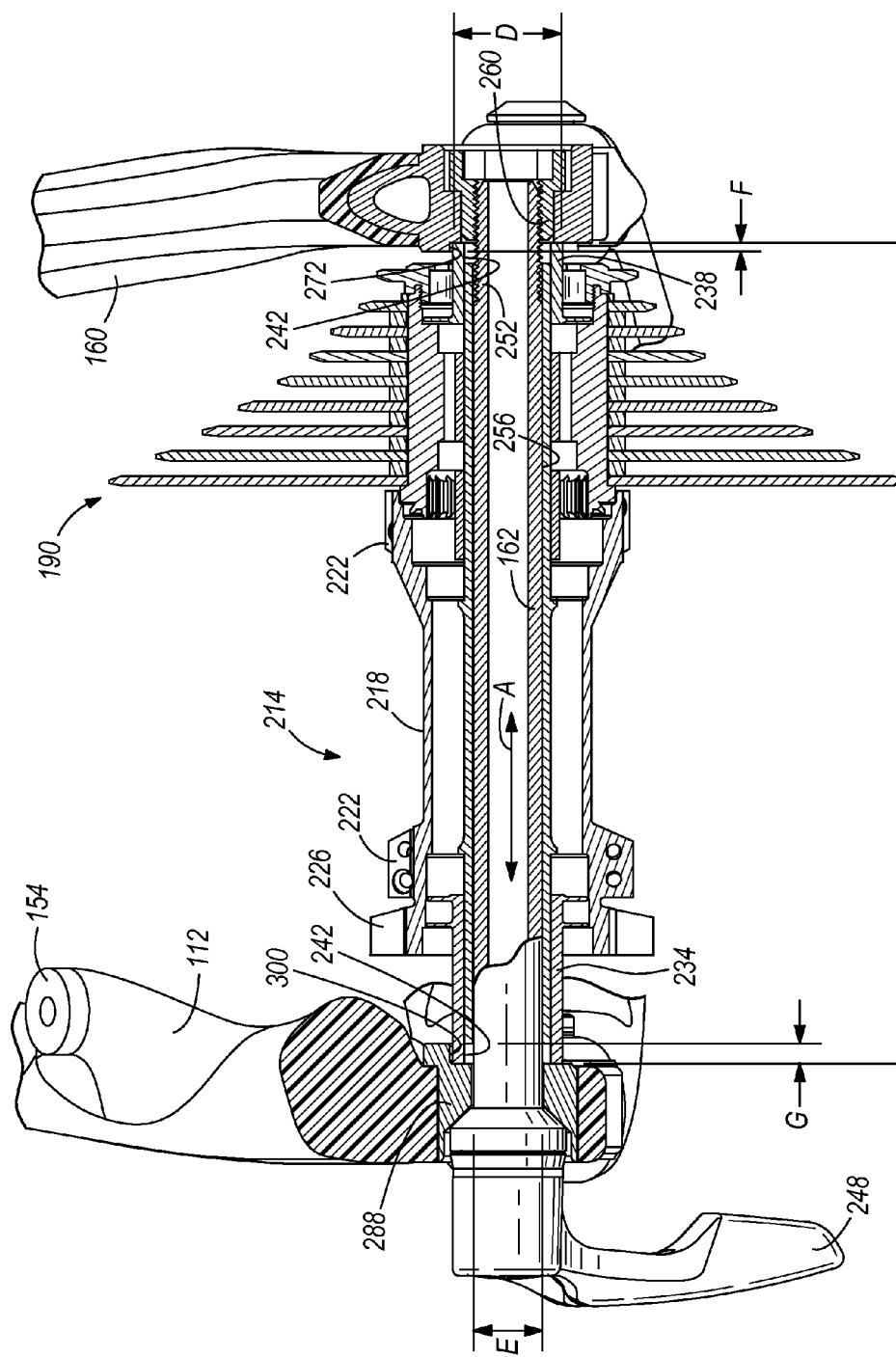
FIG. 5 is a section view of the rear axle system taken along line 5-5 of FIG. 1.

As shown in FIGS. 3, 4, and 5, the right lip 272 has an axial length F or depth that is less than the axial length G of the left lip 300. In the illustrated construction, the axial length F of the right lip 272 is about forty-two percent (42%) of the axial length G of the left lip 300.

Turning to FIG. 5, the hub spacing C is clearly shown. In the illustrated construction, the hub spacing C is substantially equal to the space between the right recessed surface 280 and the left recessed surface 308 when the hub 214 is secured to the dropouts 146, 150. The illustrated hub spacing C is about one-hundred-forty-two millimeters (142 mm). The illustrated axial length F of the right lip 272 is about one percent (1.1%) of the hub spacing C.

The right slot 276 has a lateral dimension H (see FIG. 3) about equal to the right end cap diameter D such that the lateral dimension H of the right slot 276 is about nineteen millimeters (19 mm). The illustrated right lip 272 has an axial length F about eight percent (8%) of the lateral dimension H of the right slot 276.

To assemble the rear axle system, the hub 214 is positioned between the rear left dropout 146 and the rear right dropout 150, with the apertures 242 in the end caps aligned with the openings in the dropouts. The rear axle 162 is then inserted through the rear left dropout 146, the hub 214, and the rear right dropout 150. The threaded portion 252 of the rear axle 162 threads into the nut 260 and the quick connect cam 248 is rotated to secure the rear axle 162 in place.

One advantage of the inventive rear axle system is an increased space between the right inner surface 264 and the left inner surface 292 (dimension C minus G minus F). The illustrated space is about one-hundred-thirty-seven millimeters (137 mm) compared to one-hundred-thirty-five millimeters (135 mm) without the inventive concepts. The extra space allows for a wider hub 214 with a more stable rear wheel 22 because the rear cogs 190 can be moved outward (i.e. to the right in FIGS. 5 and 6) to allow more room between the spoke flanges 222. As illustrated in FIG. 6, a cog spacing I between the rightmost rear cog 190 and the right recessed surface 280 (or the rightmost rear cog 190 and the end of the right end cap 238) is decreased when compared to prior art arrangements. The illustrated cog spacing I is about 5.5 millimeters, compared to 7.5 mm in the prior art. As a result, it can be seen that this spacing I is about 3.9% of the hub spacing (142 mm). This feature is also a feature of the rear wheel hub by comparing the spacing I to the hub spacing C.

Various features and advantages of the invention are set forth in the following claims.

The invention claimed is:

1. A bicycle comprising:
 a front wheel and a rear wheel, the rear wheel including:
  a first end cap and a second end cap, wherein each end cap has a hole extending through the end cap, and wherein the holes are aligned with each other; and
  an axle positioned in the holes in the end caps and defining an axial direction;
 a frameset supported by the front wheel and the rear wheel, the frameset including a first dropout and a second dropout, wherein each dropout has:
  an opening aligned with the holes in the end caps, the axle being positioned in the opening of each dropout; and
  a lip defining a slot aligned with and larger than the openings, each of the lips being dimensioned to receive a corresponding end cap of the rear wheel,
 wherein the lip of the first dropout has an axial length less than the lip of the second dropout.

2. A bicycle as claimed in claim 1, wherein the first dropout is a right dropout and the second dropout is a left dropout.

3. A bicycle as claimed in claim 1, wherein the axial length of the lip of the first dropout is less than 75% of an axial length of the lip of the second dropout.

4. A bicycle as claimed in claim 1, wherein the axial length of the lip of the first dropout is less than 60% of an axial length of the lip of the second dropout.

5. A bicycle as claimed in claim 1, wherein the axial length of the lip of the first dropout is less than 50% of an axial length of the lip of the second dropout.

6. A bicycle as claimed in claim 1, wherein the first and second end caps are spaced from each other to define a hub spacing, wherein the rear wheel further includes an outer cog, wherein the slot defines a recessed surface of the dropout, and wherein a cog spacing from a center of the cog to the recessed surface is less than 5% of the hub spacing.

7. A bicycle as claimed in claim 6, wherein the cog spacing is less than 4.5% of the hub spacing.

8. A bicycle as claimed in claim 6, wherein the cog spacing is less than 4% of the hub spacing.

9. A bicycle comprising:
 a front wheel and a rear wheel, the rear wheel including:
  two end caps spaced from each other to define a hub spacing, wherein each end cap has a hole extending through the end cap, and wherein the holes are aligned with each other;
  an axle positioned in the holes in the end caps and defining an axial direction; and
  an outer cog;
 a frameset supported by the front wheel and the rear wheel, the frameset including two dropouts, wherein each dropout has:
  an opening aligned with the holes in the end caps, the axle being positioned in the opening of each dropout; and
  a lip defining a slot aligned with and larger than the openings, the slot defining a recessed surface of the dropout, wherein each of the lips is dimensioned to receive a corresponding end cap of the rear wheel,
 wherein a cog spacing from a center of the cog to the recessed surface is less than 5% of the hub spacing.

10. A bicycle as claimed in claim 9, wherein the cog spacing is less than 4.5% of the hub spacing.

11. A bicycle as claimed in claim 9, wherein the cog spacing is less than 4% of the hub spacing.

12. A bicycle frame comprising first and second rear dropouts, wherein each dropout has:
 an opening adapted to receive an axle; and
 a lip defining a slot aligned with and larger than the openings, each of the lips being dimensioned to receive a corresponding end cap of a wheel, wherein the lip of the first dropout has an axial length less than the lip of the second dropout.

13. A bicycle frame as claimed in claim 12, wherein the first dropout is a right dropout and the second dropout is a left dropout.

14. A bicycle frame as claimed in claim 12, wherein the axial length of the lip of the first dropout is less than 75% of an axial length of the lip of the second dropout.

15. A bicycle frame as claimed in claim 12, wherein the axial length of the lip of the first dropout is less than 60% of an axial length of the lip of the second dropout.

16. A bicycle frame as claimed in claim 12, wherein the axial length of the lip of the first dropout is less than 50% of an axial length of the lip of the second dropout.

* * * * *